(12) United States Patent
King

(10) Patent No.: US 9,091,457 B2
(45) Date of Patent: *Jul. 28, 2015

(54) ELECTRO-THERMAL HEATING SYSTEM

(75) Inventor: Ray King, Pickering (CA)

(73) Assignee: DYNACURRENT TECHNOLOGIES, INC. (CA)

( * ) Notice: Subject to any disclaimer, the term of this patent is extended or adjusted under 35 U.S.C. 154(b) by 502 days.

This patent is subject to a terminal disclaimer.

(21) Appl. No.: 13/064,075

(22) Filed: Mar. 4, 2011

(65) Prior Publication Data

US 2012/0223065 A1 Sep. 6, 2012

(51) Int. Cl.
| | | |
|---|---|---|
| *H05B 3/00* | (2006.01) | |
| *A47J 31/54* | (2006.01) | |
| *F24H 1/10* | (2006.01) | |
| *F24H 3/02* | (2006.01) | |
| *F24H 9/00* | (2006.01) | |
| *F24D 3/12* | (2006.01) | |

(52) U.S. Cl.
CPC ............... *F24H 1/103* (2013.01); *F24H 3/022* (2013.01); *F24H 9/001* (2013.01); *F24D 3/12* (2013.01)

(58) Field of Classification Search
CPC .......... F24H 1/10–1/167; F24H 9/00–9/0021; F24H 9/12; F24H 9/122; F24H 9/128; H05B 2203/021
USPC .......... 219/201, 202, 523, 538–541; 392/441, 392/447–459, 465–467, 491–498
See application file for complete search history.

(56) References Cited

U.S. PATENT DOCUMENTS

| | | | |
|---|---|---|---|
| 1,376,509 A | 5/1921 | Borst, Jr. | |
| 1,458,666 A | 3/1924 | Harding | |
| 1,485,667 A | 3/1924 | Harding | |
| 1,505,179 A | 8/1924 | Whiteley | |
| 1,509,207 A * | 9/1924 | Hudson | ........................ 392/401 |
| 1,519,395 A | 12/1924 | Clench | |

(Continued)

FOREIGN PATENT DOCUMENTS

| | | |
|---|---|---|
| CA | 2017503 | 11/1990 |
| CA | 2551341 | 12/2007 |

(Continued)

OTHER PUBLICATIONS

International Preliminary Report on Patentability; PCT/CA2007/001145; 3 pages; Oct. 30, 2008.

(Continued)

*Primary Examiner* — Sang Y Paik
(74) *Attorney, Agent, or Firm* — Schmeiser, Olsen & Watts, LLP

(57) ABSTRACT

An electro-thermal heating system comprising a substantially hollow housing having detachable upper and lower plates for covering and sealing top and bottom surfaces of the housing. The housing has an inlet and an outlet for a flow of coolant to enter into and leave the housing, and has openings defined therein, for insertion of electric heating elements therein to project into the housing and be in direct contact with the coolant to heat it. The inlet and the outlet can be interconnected with piping to form a closed fluid flow circuit. The housing is substantially circular, to circulate flow of the coolant in a circular manner within the housing, and a diameter of the inlet is greater than a diameter of the outlet, to keep coolant in the housing longer to heat it. A pump and a power source can be interconnected to the system to circulate the coolant in the closed fluid flow circuit.

12 Claims, 5 Drawing Sheets

(56) References Cited

U.S. PATENT DOCUMENTS

| | | | |
|---|---|---|---|
| 1,546,959 A | | 7/1925 | Wilson |
| 1,759,389 A | | 5/1930 | Bowen |
| 1,816,850 A | | 8/1931 | Hurd |
| 1,850,156 A | * | 3/1932 | Richardson ............ 392/492 |
| 1,985,830 A | | 12/1934 | Hynes |
| 2,205,145 A | | 6/1940 | Klingner |
| 2,266,216 A | | 12/1941 | Kimberlin |
| 2,530,382 A | * | 11/1950 | Downs ............ 417/129 |
| 2,557,369 A | | 6/1951 | Broderick |
| 2,589,566 A | | 3/1952 | Neth et al. |
| 2,686,863 A | | 8/1954 | Chandler |
| 2,745,941 A | | 5/1956 | McElhaney |
| 2,775,682 A | | 12/1956 | Hynes |
| 2,791,271 A | | 5/1957 | Kauffeld |
| 2,813,964 A | | 11/1957 | Cerulli |
| 2,825,791 A | * | 3/1958 | Jackson ............ 237/8 R |
| 2,834,865 A | * | 5/1958 | Coates ............ 392/450 |
| 3,171,016 A | | 2/1965 | Sukala |
| 3,209,123 A | | 9/1965 | Windsor |
| 3,353,000 A | * | 11/1967 | Tomlinson ............ 392/492 |
| 3,435,404 A | | 3/1969 | Kato |
| 3,484,580 A | * | 12/1969 | Morgan ............ 392/450 |
| 3,496,991 A | | 2/1970 | Barnd |
| 3,626,148 A | | 12/1971 | Woytowich et al. |
| 3,638,619 A | | 2/1972 | Hall et al. |
| 3,642,176 A | * | 2/1972 | Dreibelbis et al. ......... 222/146.5 |
| 3,646,314 A | | 2/1972 | Windsor |
| 3,673,385 A | | 6/1972 | Drugmand et al. |
| 3,868,494 A | * | 2/1975 | Pepin ............ 392/377 |
| 3,919,520 A | | 11/1975 | Pickard |
| 3,969,605 A | | 7/1976 | Danell |
| 4,208,570 A | | 6/1980 | Rynard |
| 4,245,593 A | | 1/1981 | Stein |
| 4,286,139 A | | 8/1981 | Taylor |
| 4,377,737 A | | 3/1983 | Berry |
| 4,395,618 A | | 7/1983 | Cunningham |
| 4,419,567 A | | 12/1983 | Murphy et al. |
| 4,489,242 A | | 12/1984 | Worst |
| 4,514,617 A | | 4/1985 | Amit |
| 4,604,515 A | | 8/1986 | Davidson |
| 4,617,456 A | | 10/1986 | Richards et al. |
| 4,692,592 A | * | 9/1987 | Kale ............ 392/450 |
| 4,732,229 A | | 3/1988 | Lucht |
| 4,770,134 A | | 9/1988 | Foreman et al. |
| 4,808,793 A | | 2/1989 | Hurko |
| 4,835,365 A | | 5/1989 | Etheridge |
| 4,891,335 A | | 1/1990 | McNeilly |
| 5,216,743 A | * | 6/1993 | Seitz ............ 392/490 |
| 5,285,963 A | | 2/1994 | Wakefield et al. |
| 5,400,432 A | | 3/1995 | Kager et al. |
| 5,408,960 A | | 4/1995 | Woytowich |
| 5,438,642 A | | 8/1995 | Posen |
| 6,157,776 A | | 12/2000 | Onken |
| 6,215,310 B1 | | 4/2001 | Petrovich et al. |
| 6,243,535 B1 | | 6/2001 | Bochud |
| 6,289,177 B1 | | 9/2001 | Finger et al. |
| 6,424,801 B1 | | 7/2002 | Rabadi |
| 6,643,454 B1 | | 11/2003 | Rochelle |
| 6,647,204 B1 | | 11/2003 | Hutchinson |
| 6,873,793 B2 | | 3/2005 | Thweatt, Jr. |
| 6,996,336 B1 | | 2/2006 | Mahoney et al. |
| 7,039,305 B1 | | 5/2006 | Chen |
| 7,065,292 B2 | | 6/2006 | Thweatt, Jr. |
| 7,082,904 B2 | | 8/2006 | Takano |
| 7,207,379 B2 | | 4/2007 | Takano et al. |
| 7,330,645 B2 | * | 2/2008 | Kwon ............ 392/456 |
| 7,572,480 B2 | | 8/2009 | May et al. |
| 8,515,268 B2 | | 8/2013 | Anliker |
| 2002/0146244 A1 | | 10/2002 | Thweatt, Jr. |
| 2003/0039474 A1 | | 2/2003 | Eller et al. |
| 2004/0022529 A1 | | 2/2004 | Lamb |
| 2004/0170411 A1 | | 9/2004 | Kuebler et al. |
| 2006/0163235 A1 | | 7/2006 | Warren et al. |
| 2008/0083737 A1 | | 4/2008 | Vu |
| 2008/0156285 A1 | | 7/2008 | King |
| 2009/0139472 A1 | | 6/2009 | Gehres et al. |
| 2010/0059599 A1 | | 3/2010 | King |
| 2012/0224836 A1 | | 9/2012 | King |
| 2013/0016959 A1 | | 1/2013 | King |
| 2013/0206744 A1 | | 8/2013 | King |

FOREIGN PATENT DOCUMENTS

| | | |
|---|---|---|
| CA | 2668817 | 12/2010 |
| JP | 57-173558 | 10/1982 |
| KP | 10-2004-0001394 A | 1/2004 |
| KR | 10-2004-0001395 A | 1/2004 |
| KR | 10-2004-0061534 A | 7/2004 |
| WO | WO-2008/000076 A1 | 1/2008 |

OTHER PUBLICATIONS

Written Opinion of the International Searching Authority; PCT/CA2007/001145; 5 pages; Oct. 5, 2007.
U.S. Appl. No. 13/666,537, filed Nov. 3, 2008, King, Ray.
U.S. Appl. No. 12/457,397, filed Jun. 10, 2009, King, Ray.
US Office Action in U.S. Appl. No. 12/557,682, issued Jun. 19, 2013; 14 pages.
US Office Action in U.S. Appl. No. 12/457,397, issued Jul. 30, 2013, 22 pages.
"Glow Plugs as Cooling Water Pre-Heater in Modern Diesel Cars (Type GN)"; BERU AG, Nov. 5, 2002. Archive.org Apr. 22, 2008. <http://web.archive.org/web/20021115200353/http://www.beru.com/english/produkte/gluehkerzen/gn.php>.
"Internet Archive Wayback Machine." Archive.org Apr. 11, 2008. <http://web.archive.org/web/*/http://www.beru.com/english/produkte/gluehkerzen/gn.php>.
Office Action for U.S. Appl. No. 13/507,604; issued Dec. 4, 2013; 14 pages.
Office Action for U.S. Appl. No. 12/557,682, issued Feb. 20, 2014; 22 pages.

* cited by examiner

ELECTRO-THERMAL HEATING SYSTEM

This invention relates generally to a heating system, and more particularly to an improved electro-thermal heating system which is durable and reliable, that possesses easily removable or replaceable heating elements, and which can be easily installed in, for example, a home or garage.

DESCRIPTION OF THE PRIOR ART

It is well known that, for example, furnaces can be used to heat spaces such as homes. Traditionally, such furnaces were oil furnaces. However, as the demand for oil has risen sharply in the last decade, the price has correspondingly risen sharply, reducing the ability of such furnaces to be economical to the home or business owner. Recently, gas-fired applications, using natural gas, have been much in demand for homeowners in economically heating their home. However, much as has occurred with oil, natural gas has also seen large price increases in the last couple of years, which has also reduced the economical viability of gas-fired applications.

It is also well known to heat homes or spaces using, for example, electrical baseboards, but, as hydro rates have risen quite sharply recently, and can be expected to continue upwardly in the future, these types of devices are not necessarily economical also. In addition, heating systems such as furnaces can require a large footprint, and take up an inordinate amount of space.

In addition, certain types of pre-heaters have utilized electrical elements internally positioned within the pre-heater, whereby coolant can be heated by an electrical element so as to heat an area. U.S. Pat. No. 5,408,960 (Woytowich) and U.S. Pat. No. 4,770,134 (Foreman et al) are examples of such devices. However, these arrangements feature electrical elements that are internally positioned and firmly set within a tank or chamber, and do not allow for easy removal of the electrical element from the pre-heater without complete disassembly, or destruction, of the pre-heater, should maintenance or replacement of the electrical element be required. In such maintenance or replacement situations, the entire pre-heater would be required to be removed to access the internal electrical element, thereby making maintenance and replacement of such pre-heater components difficult and complicated.

What is required is an electro-thermal heating system which is very economical, and which can generate substantial amounts of heat to heat larger spaces, such as in a home or business. Thus, there is a need for an improved environmentally friendly electro-thermal heating system for heating a space which has a generally uncomplicated and simple design, which may be installed easily, and is durable and reliable, and which possesses easily removable or replaceable heating elements. Further there is a need for an electro-thermal heating system which possesses a minimal footprint, and which be utilized in a variety of applications, from heating a home to radiant floor heating. In this regard, the present invention substantially fulfills this need.

SUMMARY OF THE INVENTION

It is an object of the present invention to provide an improved, environmentally friendly electro-thermal heating system which has a generally uncomplicated and simple design, which possesses a minimal footprint, and which has a housing with an inlet and outlet for permitting a flow of coolant therein, which can then be interconnected with piping to form a closed fluid flow circuit.

It is another object of the present invention to provide an improved electro-thermal heating system having a housing with openings defined therein whereby easily removable electric heating elements can be inserted to project into the housing and be in direct contact with the coolant to heat it.

It is another object of the present invention to provide an improved electro-thermal heating system wherein the housing is substantially circular, to circulate flow of the coolant in a circular manner within the housing, and wherein a diameter of the inlet is greater than a diameter of the outlet, so as to temporarily inhibit and keep coolant in the housing longer to heat it in a faster and more efficient manner.

According to one aspect of the present invention, there is provided an electro-thermal heating system comprising a housing comprising at least one opening defined therein and having an inlet for permitting a flow of coolant into and throughout the housing and an outlet for permitting a transfer of heated coolant out of the housing, a diameter of the inlet being greater than a diameter of the outlet, the inlet and the outlet being constructed and arranged for interconnection with an inlet pipe and an outlet pipe, respectively, for forming a closed fluid flow circuit; at least one electric heating element constructed and arranged for insertion into the at least one opening and projecting into the housing whereby the at least one electric heating element is in direct contact with the coolant, the at least one electric heating element being removable without disassembly of the housing.

According to another aspect of the present invention, there is provided an electro-thermal heating system comprising a substantially circular and substantially hollow housing comprising at least one opening defined therein; an inlet for permitting a flow of coolant to enter into the housing, the housing being constructed and arranged to circulate the flow of the coolant in a circular manner within the housing; an outlet for permitting a transfer of heated coolant out of the housing; a detachable upper plate for covering and sealing a top surface of the housing; a detachable lower plate for covering and sealing a bottom surface of the housing; and at least one electric heating element constructed and arranged for insertion into the at least one opening and projecting into the housing whereby the at least one electric heating element is in direct contact with the coolant, the at least one electric heating element being removable without disassembly of the housing; and wherein a diameter of the inlet is greater than a diameter a the outlet, the inlet and the outlet being constructed and arranged for interconnection with an inlet pipe and an outlet pipe, respectively, for forming a closed fluid flow circuit.

According to another aspect of the present invention, there is provided an electro-thermal heating system comprising a substantially circular and substantially hollow housing comprising at least one opening defined therein; an inlet for permitting a flow of coolant to enter into the housing, the housing being constructed and arranged to circulate the flow of the coolant in a circular manner within the housing; an outlet for permitting a transfer of heated coolant out of the housing, wherein a diameter of the inlet is greater than a diameter of the outlet, the inlet and the outlet being constructed and arranged for interconnection with an inlet pipe and an outlet pipe, respectively, for forming a closed fluid flow circuit, and wherein the inlet is positioned towards a lower surface of the housing and the outlet is positioned towards an upper surface of the housing; a detachable upper plate for covering and sealing a top surface of the housing; a detachable lower plate for covering and sealing a bottom surface of the housing; and at least one middle plate having a lesser surface area than the upper plate and the lower plate, for temporarily inhibiting the transfer of heated coolant out of the housing; at least one electric heating element constructed and arranged for insertion into the at least one opening and projecting into the housing whereby the at least one electric heating element is in direct contact with the coolant, the at least one electric heating element being removable without disassembly of the housing; a pump in communication with the heating system for continuously circulating the coolant throughout the closed fluid flow circuit; and a power source constructed and arranged for connection with the heating system, the power source supplying the at least one electric heating element and the pump with power.

The advantage of the present invention is that it provides an improved, environmentally friendly electro-thermal heating system which has a generally uncomplicated and simple design, which possesses a minimal footprint, and which has a housing which can circulate and heat a flow of coolant therein. The housing can then be interconnected with piping to form a closed fluid flow circuit, whereby heat from the heated coolant can be used to heat a space remote from the housing. Further, the system can be integrated with pumps, and connected to a power source, whereby the closed fluid flow circuit can be used to circulate and radiate heat in a variety of applications, such as radiant floor heating, home heating, and so forth.

Yet another advantage of the present invention is to provide an improved electro-thermal heating system having a housing with an inlet for permitting a flow of coolant into and throughout the housing and an outlet for permitting a transfer of heated coolant out of the housing, wherein a diameter of the inlet is greater than a diameter of the outlet so as to keep coolant in the housing longer to heat it, therefore heating the coolant in a faster and more efficient manner.

BRIEF DESCRIPTION OF THE DRAWINGS

A preferred embodiment of the present invention is described below with reference to the accompanying drawings, in which.

DESCRIPTION OF THE PREFERRED EMBODIMENT

Figure 1:
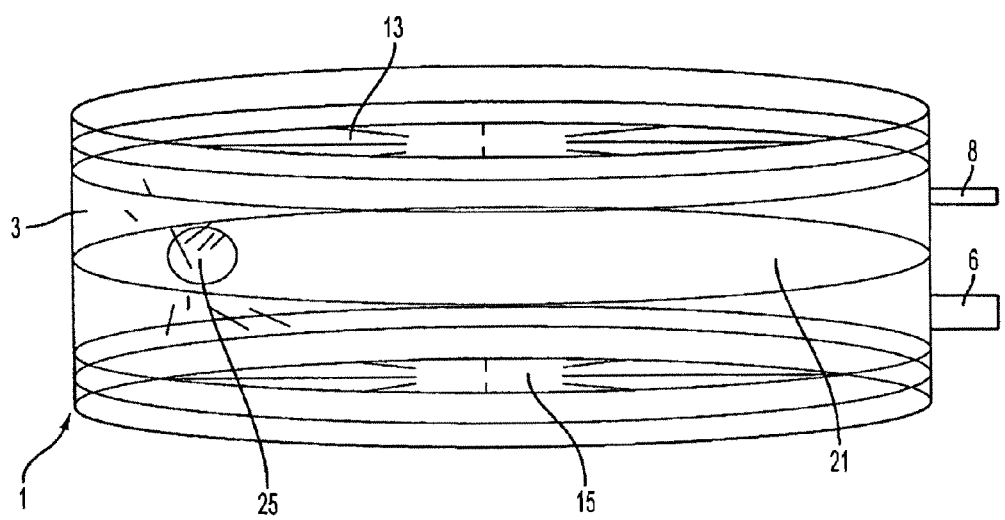
FIG. 1 is a side perspective view of one embodiment of the housing of the electro-thermal heating system of the present invention, illustrating the upper, middle and lower plates for covering and sealing top and bottom surfaces of the housing.

In overview of operation, as shown in FIGS. 1 to 4, the present invention comprises an electro-thermal heating system 1 comprising a substantially hollow housing 3 having detachable upper 13 and lower 15 plates for covering and sealing top and bottom surfaces of the housing 3. The housing 3 has an inlet 5 and an outlet 7 for a flow of coolant 4 to enter into and leave the housing 3, and has openings 9 defined therein, for insertion of electric heating elements 11 therein to project into the housing 3 and be in direct contact with the coolant 4 to heat it. The inlet 5 and the outlet 7 can be interconnected with piping (6,8) to form a closed fluid flow circuit. A diameter of the inlet 5 is greater than a diameter of the outlet 7, so as to temporarily inhibit and keep coolant 4 in the housing 3 longer to heat it in a faster and more efficient manner.

Further, the housing can possess, in addition to the detachable upper 13 and lower 15 plates, one or more detachable middle plates present in the housing 3, each of which can be of a reduced surface area, or have water inlet holes defined therethrough, with a view to further aiding in temporarily inhibiting and keep coolant 4 in the housing 3 longer to be heated by electric heating elements 11. Radiator panels (not shown) can be connected to the closed fluid flow circuit to radiate the heat from the coolant 4 flowing in the circuit to a space (not shown) to be heated by the electro-thermal heating system 1. Such a space could be, for example, a home, a room, an office, radiant flooring or a building. If desired, such generated heat can be circulated by means of a conventional fan or blower. A pump (not shown) and a power source (not shown) can be interconnected to the system 1 to circulate the coolant 4 in the closed fluid flow circuit.

Figure 2:
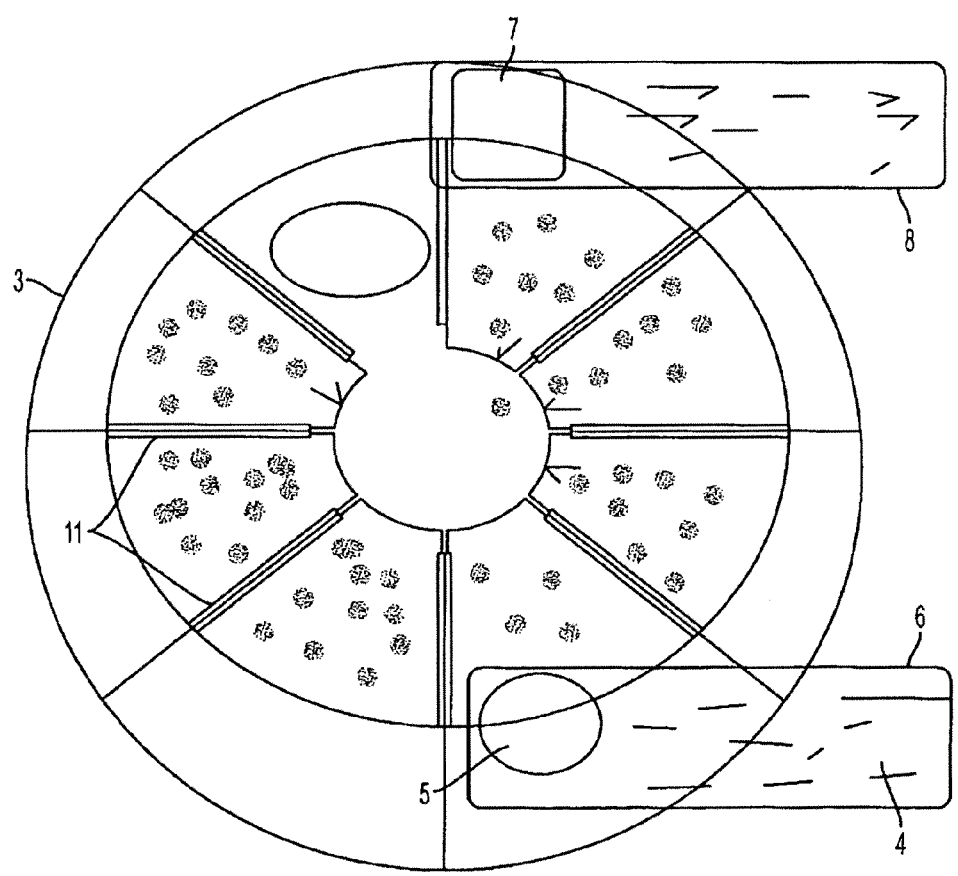
FIG. 2 is a side perspective view of an embodiment of the electro-thermal heating system of the present invention.

In terms of describing the individual components of the system in greater detail, and with reference to FIG. 2, the heating system of the present invention is designated in its entirety by the reference numeral 1. With further reference to FIGS. 1 and 2, there is shown an embodiment of the housing 3 of the electro-thermal heating system 1 of the present invention. In an exemplary embodiment, the electro-thermal heating system 1 comprises a housing 3 through which coolant 4 may pass through the housing 3, by means of inlet 5. Preferably, the housing 3 is made of metal, though it is conceivable that other materials could also be utilized, as would be apparent to one skilled in the art. The size of the housing can be varied, such as 7 inches wide by 2 inches high, or 4 inches by 3 inches, for example only.

Further, the housing 3 possesses an outlet 7 for a flow of heated coolant 4 to leave the housing 3, as hereinafter described. The inlet 5 and the outlet 7 are constructed and arranged for interconnection with piping to form a closed fluid flow circuit. With reference to FIG. 2, the inlet pipe, with coolant 4 flowing therethrough, can be seen as "6", and the outlet pipe, with heated coolant flowing therethrough leaving the housing, can be seen as "8". Once inlet pipe 6 and outlet pipe 8 are interconnected to the system 1, a pump and a power source (each not shown) can be interconnected to the system to circulate the coolant 4 in the closed fluid flow circuit, and through the system 1, it being understood that conventional power sources or pumps could be utilized. For example, in one embodiment, the power source can be an electrical type power source, or a power pack that can be plugged in by means of a power cord (not shown), though it is conceivable that, alternatively, other types of power sources could be utilized, such as solar power cells, A/C power, DC power pack, battery, wind generated power sources or the like, as would be apparent to one skilled in the art. It will be understood that the power source can be activated conventionally, or, for example, by a remote device (not shown), as would be understood by one skilled in the art.

Figure 3:
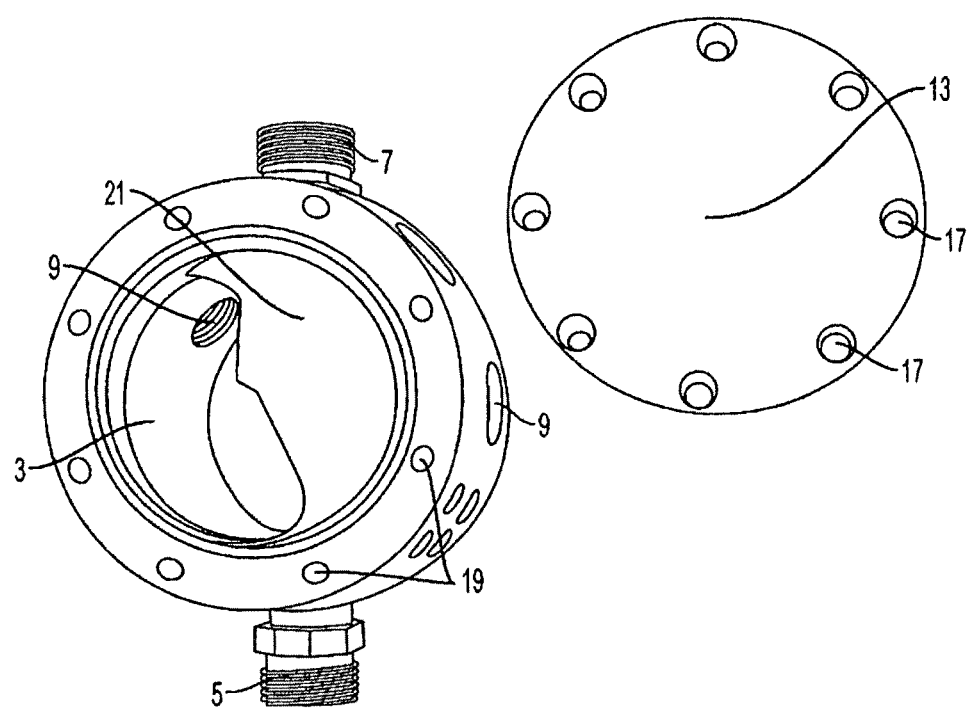
FIG. 3 is a top view of an embodiment of the electro-thermal heating system of the present invention, illustrating the housing with the upper plate for covering a top surface of the housing detached.
Figure 4:
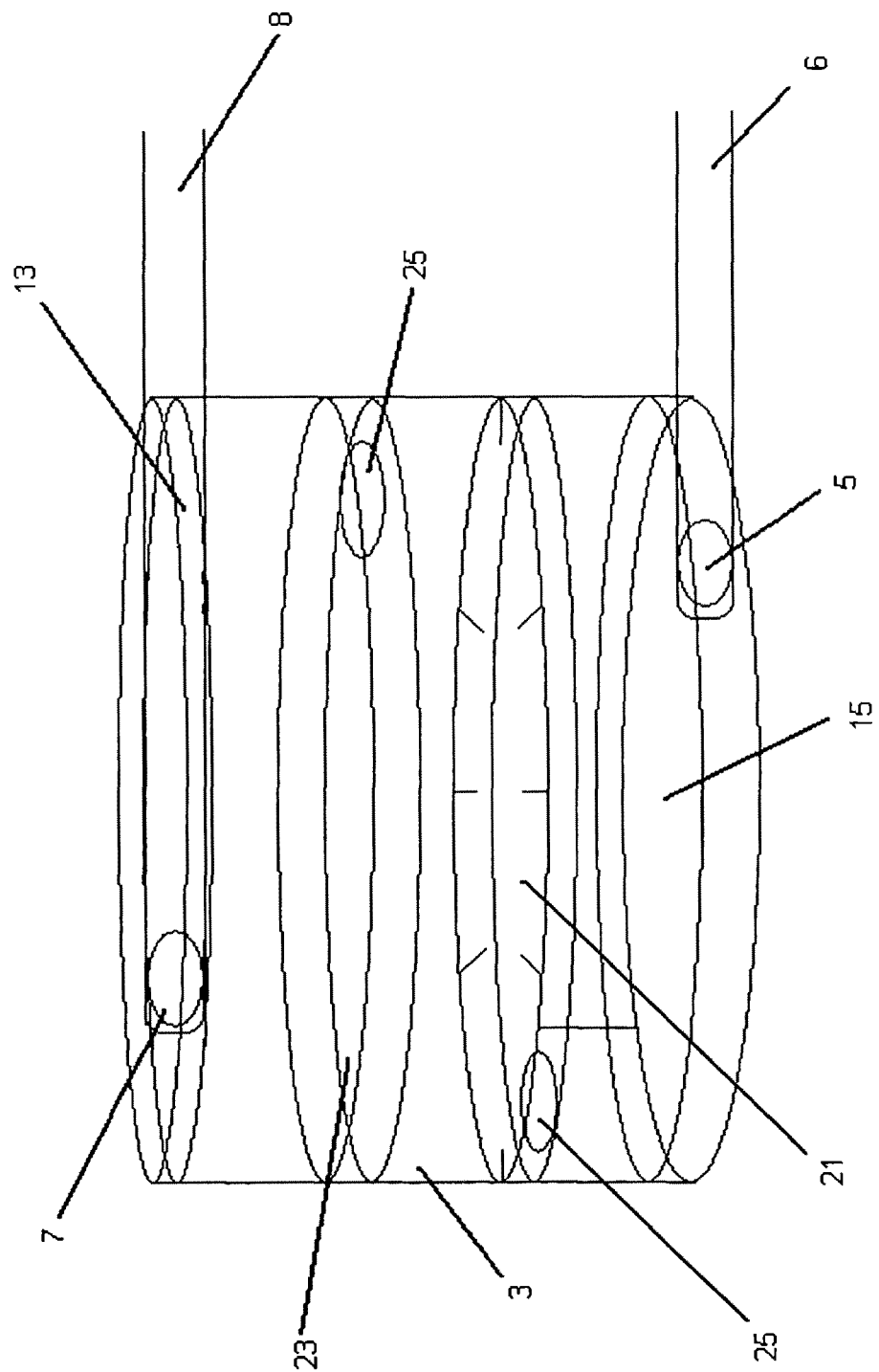
FIG. 4 is a side perspective view of a further embodiment of the electro-thermal heating system of the present invention, illustrating the upper, multiple middle and lower plates for covering and sealing top and bottom surfaces of the housing.

The housing 3, with further reference to FIG. 3, has openings 9 defined therein, for insertion of electric heating elements 11 therein (shown in FIG. 2) to project inwardly into the housing 3 and be positioned so as to be in direct contact with the coolant 4 to heat it. The number of electric heating elements 11 which could be utilized could be varied, depending upon the application of the system, and the size required of the system. For example, as few as two heating elements could be used, or up to sixteen, or more.

Preferably, the coolant 4 will be water, though it is conceivable that other fluids could be utilized, as would be apparent to one skilled in the art. Of course, electric heating elements 11 are connected to, and supplied with, power from the power source (not shown) for enabling the electric heating elements 11 to heat the coolant 4, the coolant of course being circulated throughout the system by the pump. The electrical connection portion (not shown) of electric heating elements 11 can, as an example, be made of Inconel™, it being understood that this refers to a family of austenitic nickel chromium-based super-alloys, which are typically used in high temperature applications. Common trade names for Inconel™ include: Inconel 625™, Chronin 625™, Altemp 625™, Haynes 625™, Nickelvac 625™ and Nicrofer 6020™, for example.

The housing 3, again with reference to FIG. 1, is substantially hollow, and has a detachable upper plate 13 and detachable lower plate 15 for covering and sealing top and bottom surfaces of the housing 3. Further, the housing 3, as can be seen, in an exemplary embodiment, is substantially circular, so as to circulate the flow of coolant 4 entering into the housing 3 through inlet 5 in a circular manner within the housing 3.

With reference to FIG. 3, it can be seen that the upper plate 13 has securing holes 17, through which the plates can be secured (such as with screws or the like) to the housing to cover the top and bottom surfaces thereof. Though not shown in FIG. 3, it will also be understood that lower plate 15 will likewise have securing holes 17 thereon. The upper surface of the housing 3 will likewise have securing regions 19 defined therein for receiving screws or securing means placed through securing holes 17. Preferably, any of the electric heating elements 11 are easily removable and replaceable if required from the housing 3, either by removing them from openings 9 in the housing 3, or, alternatively, by detaching the upper plate 13 and lower plate 15 from the housing 3 and removing the electric heating elements 11.

In an exemplary embodiment, a diameter of the inlet 5 is greater than a diameter of the outlet 7, with a view to temporarily inhibiting the release of coolant 4 from the housing 3, through outlet 7, thus keeping coolant 4 in the housing 3 longer so as to be heated by electric heating elements 11. In addition, with reference to FIG. 3, the housing 3 possesses one or more detachable middle 21 plates, which can be positioned within the interior of the housing 3. As can be seen in FIG. 3, the middle plate 21 is of a reduced surface area, being essentially cut in half as compared to upper plate 13, with a view to further aiding in temporarily inhibiting and keep coolant 4 in the housing 3 longer to be heated by electric heating elements 11. Or, with reference to FIG. 4, which illustrates the housing 3 having two middle plates (21,23), these middle plates can be substantially solid, but each possessing at least one water inlet hole 25 defined therethrough, again, with a view to further aiding in temporarily inhibiting and keep coolant 4 in the housing 3 longer to be heated by electric heating elements 11. With this in mind, and with reference to FIGS. 1 and 4, the inlet 5 is positioned towards a lower surface of the housing 3 and the outlet 7 is positioned towards an upper surface of the housing 3 to further aid in temporarily inhibiting and keep coolant 4 in the housing 3 longer to be heated by electric heating elements 11.

As noted previously, radiator panels (not shown) can be connected to the closed fluid flow circuit to radiate the heat from the coolant 4 flowing in the circuit to a space (not shown) to be heated by the electro-thermal heating system 1. Such a space could be, for example, a home, a room, an office, radiant flooring or a building, or other applications, as could be contemplated by one skilled in the art. If desired, such generated heat can be circulated by means of a conventional fan or blower.

The electro-thermal heating system can be activated by a remote device (not shown) by a user, whereby the power source can be activated to heat the electric heating elements 11, and the interconnected system, remotely from a distance, and this heat can then be transferred by way of the heat emitting radiator panels or the like (not shown) into the space to be heated.

In another alternative embodiment of the present invention (not shown), coolant can be omitted, and dry heat, provided from the electric heating elements 11, can be utilized. In this embodiment (not shown) the housing 3 would preferably have an air passageway extending therethrough for passage of air through the housing 3. Electric heating elements would be inserted and mounted into the openings, the heating so as to project into the housing whereby the electric heating elements are in direct contact with air in the air passageway. A power source in communication with the electro-thermal heating system would supply the electric heating elements with power, for enabling the electric heating elements to heat the air. An air blower, for example, or other such device, could then direct the heated air device would direct heat to an area external to the electro-thermal heating system, such as a house or other enclosed structure, the air blower being supplied with power from the power source.

Figure 5:
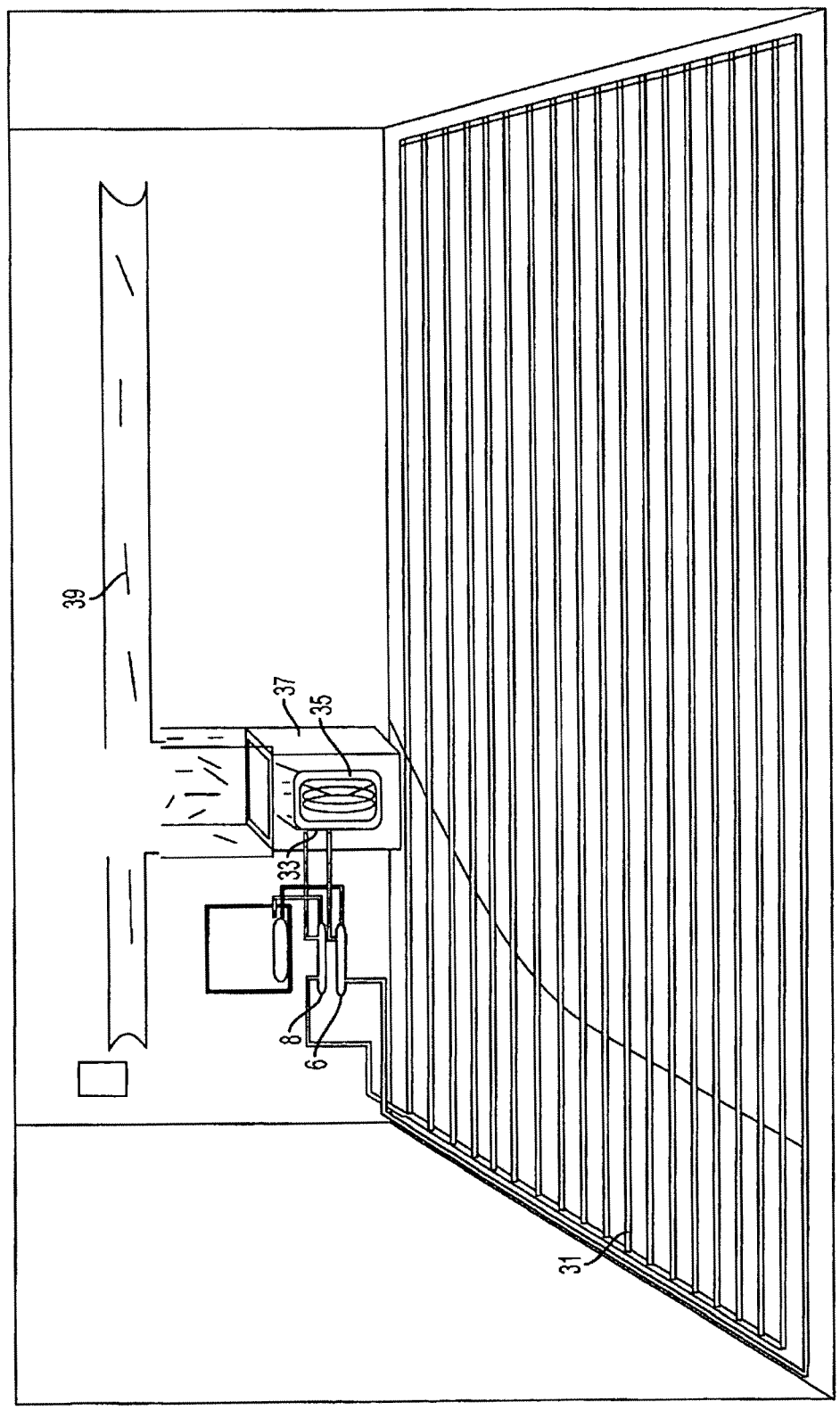
FIG. 5 is a side perspective view of a further embodiment of the electro-thermal heating system of the present invention, illustrating the system of the present invention in connection with a radiant flooring system and a furnace.

In another alternative embodiment of the present invention, shown in FIG. 5, it can be seen that inlet pipe 6 and outlet pipe 8 can be interconnected at one ends thereof to, as an example, a radiant floor heating system 31, means for doing so which would be apparent to one skilled in the art, with a view to providing in floor radiant heating. At opposite ends thereof, as at "3", the inlet pipe 6 and outlet pipe 8 of the system can be interconnected to communicate with a heating coil 35 of a home furnace 37, with heated coolant from the housing of the present invention being used to heat the heating coil 35, which can then be circulated by means of conventional air handler/blower (not shown) to circulate the heated air through the ductwork of a home.

In an alternative embodiment, the pre-heater can further comprise a thermostatic control (not shown) in association with the electric heating elements 11 and the coolant in the housing 3, wherein the thermostatic control is adapted to deactivate the electric heating elements 11 when a temperature of the coolant exceeds a pre-determined level. Further, the thermostatic control can also thus turn the electric heating elements 11 on when a temperature of the coolant falls below a pre-determined level.

The present invention has been described herein with regard to preferred embodiments. However, it will be obvious to persons skilled in the art that a number of variations and modifications can be made without departing from the scope of the invention as described herein.

The invention claimed is:
1. An electro-thermal heating system comprising:
a housing having a passage extending therethrough for passage of a coolant through the housing, the housing being substantially hollow and comprising:
an inlet for permitting a flow of the coolant to enter into the housing;
an outlet for permitting a transfer of heated coolant out of the housing, wherein a diameter of the inlet is greater than a diameter of the outlet, the inlet and the outlet being constructed and arranged for interconnection with an inlet pipe and an outlet pipe, respectively, for forming a closed fluid flow circuit;

at least two openings defined therein spaced around a perimeter of the housing which are in communication with the passage;

a detachable upper plate for covering and sealing a top surface of the housing;

a detachable lower plate for covering and sealing a bottom surface of the housing; and at least one detachable middle plate having a lesser surface area than the detachable upper plate and the detachable lower plate, and a total length lesser than the detachable upper plate and the detachable lower plate, for temporarily inhibiting the transfer of heated coolant out of the housing, the at least one detachable middle plate having at least one water inlet hole defined therethrough;

at least two heating elements constructed and arranged for insertion into the at least two openings and projecting into the housing whereby lower ends of the at least two heating elements are in direct contact with the coolant in the housing and upper ends of the at least two heating elements are accessible from an exterior surface of the housing to permit removal of the at least two heating elements from the housing without disassembly of the housing and without disconnection of the housing from the closed fluid flow circuit; and a pump in communication with the heating system for continuously circulating the coolant throughout the closed fluid flow circuit.

2. The electro-thermal heating system of claim 1, wherein the inlet pipe and the outlet pipe are interconnected at ends thereof to form the closed fluid flow circuit.

3. The electro-thermal heating system of claim 1, wherein the housing comprises a plurality of openings defined therein, each of the plurality of openings having a heating element inserted therein.

4. The electro-thermal heating system of claim 1, wherein the housing is substantially circular.

5. The electro-thermal heating system of claim 1, further comprising a power source constructed and arranged for connection with the electro-thermal heating system, the power source supplying the at least two heating elements and the pump with power.

6. The electro-thermal heating system of claim 1, wherein the at least two heating elements are glow plugs.

7. The electro-thermal heating system of claim 1, further comprising a thermostatic control in association with the at least two heating elements and the coolant in the housing, wherein the thermostatic control is configured to turn the at least two heating elements off when a temperature of the coolant exceeds a pre-determined level.

8. The electro-thermal heating system of claim 7, wherein the thermostatic control is configured to turn the at least two heating elements on when a temperature of the coolant falls below a pre-determined level.

9. The electro-thermal heating system of claim 5, wherein the power source is a power pack.

10. The electro-thermal heating system of claim 5, wherein the power source is an electrical battery.

11. The electro-thermal heating system of claim 1, wherein the at least two heating elements are DC heating elements.

12. The electro-thermal heating system of claim 1, wherein the inlet is positioned towards a lower surface of the housing and the outlet is positioned towards an upper surface of the housing.

* * * * *

UNITED STATES PATENT AND TRADEMARK OFFICE
CERTIFICATE OF CORRECTION

| | | |
|---|---|---|
| PATENT NO. | : 9,091,457 B2 | Page 1 of 1 |
| APPLICATION NO. | : 13/064075 | |
| DATED | : July 28, 2015 | |
| INVENTOR(S) | : King | |

It is certified that error appears in the above-identified patent and that said Letters Patent is hereby corrected as shown below:

Title page

Item (56), U.S. Patent Documents, page 1, delete "1,458,666" and insert --1,485,666--

Item (56), Other Publications, page 2, reference should be changed from "U.S. Appl. No. 13/666,537, filed Nov. 3, 2008" to --U.S. Appl. No. 13,666,537, filed Nov. 1, 2012--

Specification

Column 1, Line 55, delete "which be" and insert --which can be--

Column 2, Line 45, delete "diameter a the outlet," and insert --diameter of the outlet,--

Column 6, Line 28, delete "device would direct heat"

Column 6, Line 38, replace "3" with "33"

Signed and Sealed this
Twenty-ninth Day of March, 2016

Michelle K. Lee
*Director of the United States Patent and Trademark Office*